United States Patent [19]
Andersson

[11] Patent Number: 5,861,046
[45] Date of Patent: Jan. 19, 1999

[54] METHOD OF RECOVERING ENERGY, AND A REACTOR THEREFOR

[75] Inventor: Alf Ove Andersson, Frövi, Sweden

[73] Assignee: General Process AA AB, Frovi, Sweden

[21] Appl. No.: 619,534

[22] PCT Filed: Sep. 15, 1994

[86] PCT No.: PCT/SE94/00859

§ 371 Date: May 22, 1996

§ 102(e) Date: May 22, 1996

[87] PCT Pub. No.: WO95/08607

PCT Pub. Date: Mar. 30, 1995

[30] Foreign Application Priority Data

Sep. 24, 1993 [SE] Sweden ................ 9303126-8

[51] Int. Cl.[6] .................. C10J 3/34; F23C 11/02
[52] U.S. Cl. ................ 48/77; 48/101; 48/210
[58] Field of Search .............. 48/62 R, 77, 89, 48/101, 210

[56] References Cited

U.S. PATENT DOCUMENTS

| | | | |
|---|---|---|---|
| 4,243,489 | 1/1981 | Green | 48/77 |
| 4,466,360 | 8/1984 | Shang et al. | 110/264 |
| 4,519,810 | 5/1985 | Haas | 48/210 |
| 4,929,255 | 5/1990 | Hakulin et al. | 48/210 |
| 4,981,089 | 1/1991 | Spliethoff et al. | 48/107 |

FOREIGN PATENT DOCUMENTS

| | | |
|---|---|---|
| 214385 | 10/1984 | German Dem. Rep. . |
| 2828614 | 1/1979 | Germany . |
| 2203672 | 10/1988 | United Kingdom . |
| 8603986 | 7/1986 | WIPO . |

Primary Examiner—Christopher Upton
Attorney, Agent, or Firm—Baker & Botts, L.L.P.

[57] ABSTRACT

There is described a method of recovering energy and/or combustible gas by thermally gasifying fuel during its partial combustion, wherein the fuel and an oxygen-containing gas are delivered to a reactor (1) and caused to circulate in a closed circuit of reactants and reaction products during partial combustion of the fuel. Circulation is effected by virtue of the fact that the reactor (1) is configured as an ejector (9) at the location of the oxygen-containing gas inlet (8), so that the gas delivered to the reactor will function to drive reactants and reaction products around the closed circuit. The invention also relates to a reactor for carrying out the inventive method.

12 Claims, 3 Drawing Sheets

5,861,046

METHOD OF RECOVERING ENERGY, AND A REACTOR THEREFOR

The present invention relates generally to a method of recovering energy and/or combustible gas from fuel by thermal gasification of the fuel during its partial combustion. The invention also relates to a reactor for carrying out the inventive method.

BACKGROUND OF THE INVENTION

It has long been known to recover energy and/or combustible gas by partially combusting fuel in a reactor, and many different methods and processes for such recovery are known from the literature, as are also many different reactor designs for putting these processes into effect. Gasification of coal, recovery of combustible gas from waste and biomaterials of different origins, and gasification of spent liquors from the pulp industry are some examples of known applications. These processes have acquired considerable economic significance. Such methods and processes are also highly significant from an environmental aspect, since they enable waste which would otherwise be discarded and contaminate the environment to be put to a useful purpose.

In the pulp industry, different spent-liquor gasification processes, and then particularly black-liquor gasification processes have obtained more and more importance as a replacement for the earlier known combustion processes, such as the well known Tomlinson process. The recovery of energy can be kept separate from the recovery of process chemicals, by controlling the gasification process in a suitable manner and the process can also be controlled to recover sulphur in a gaseous phase and the base, for instance sodium carbonate, in a solid or molten phase. Such processes are described, for instance, in U.S. Pat. Nos. 3,073,672, 3,333,917 and 4,872,950.

It is often desirable to carry out the gasification processes at a pressure above atmospheric pressure, since this will provide several process-technical advantages. For instance, the reactor used may be given smaller dimensions while the throughput is not changed. Furthermore, the pressure can be used as a process control parameter, so as to make it possible to work at a higher temperature when using a higher pressure and to enable the process to be controlled in the desired direction. This is described, for instance, in the aforesaid U.S. Pat. No. 4,872,950.

However, the use of elevated pressures in fuel gasification processes is encumbered with several problems. When working at pressures of about 3 bars and thereabove, the volume of the reactor is normally so small as to make it difficult to maintain a good fluidization of the reacting material in the system. Furthermore, the time available for the gasification reaction is often much too short in a continuously working reactor. This results in an impaired efficiency and in a poor process economy. Poor efficiency also results in a higher load on subsequent purification apparatus and also in larger quantities of waste The present invention eliminates these problems to a great extent.

SUMMARY OF THE INVENTION

According to the invention, there is provided a method of recovering energy and/or combustible gas by thermal gasification of fuel during its partial combustion, wherein the fuel and an oxygen-containing gas are introduced into a gasification reactor, in which reactants and reaction products are kept circulating in a closed circuit while being partial combusted, and in which generated combustible gas and other reaction products are discharged from the reactor, wherein at the location at which oxygen-containing gas is introduced into the reactor, the reactor is configured as an ejector so that the oxygen-gas delivered to the reactor will function to drive the fuel and gases around in said circuit.

The fuel and the oxygen-containing gas are preferably introduced into the reactor together. The generated combustible gas and other reaction products are suitably discharged from the reactor at a location upstream of the oxygen-containing gas inlet.

The thermal gasification process is preferably effected at a pressure of 2–40 bars above atmospheric pressure.

The invention also relates to a reactor for recovering energy and/or combustible gas from fuel by thermal gasification of the fuel during its partial combustion, wherein the reactor includes a reactor chamber, a fuel inlet, an inlet for oxygen-containing gas, and an outlet for combustible gas and other reaction products. According to the invention, the reactor chamber is constructed to maintain a closed circulation of reactants and reactant products in the reactor, and at the location of the oxygen-containing gas inlet, the reactor chamber is configured as an ejector so that oxygen-containing gas introduced into the reactor will function to drive the reactants and the reaction products around in the closed circuit.

The fuel and the oxygen-containing gas are preferably introduced together through one and the same inlet. The outlet through which combustible gas and other reaction products are discharged is suitably located upstream of the oxygen-containing gas inlet.

U.S. Pat. No. 4,466,360 describes a reactor which is intended for the combustion of fuel particles, particularly coal. The reactor is configured as an elongated ring and the fuel is injected into the reactor with the aid of an air stream and is driven around the reactor through the medium of contributory air injection lines. The specification makes no mention of an ejector effect or the use of an overpressure. The reactor is given its particular configuration so that as the particles are driven round the reactor, they will be worn down by contact with one another, to expose fresh combustion surfaces and to form a combustion product in the form of a fine dust or powder. This fine dust is discharged from the reactor at a specific location, where the dust particles are separated from the larger particles, since these particles are affected more by the centrifugal forces that are generated as the flow in the reactor is forced to change direction.

U.S. Pat. No. 2,203,672 describes a system for returning fine-grain material that has been entrained by the gas which flows through a fluidized bed in a reactor. Thus, it is not primarily fuel that is caused to circulate in a closed circuit, but mainly material from the fluidized bed, and it is not the intention to introduce fresh fuel and air of combustion into this circuit for reaction therein. Although the arrangement includes an ejector, the purpose of the ejector is not to drive reactants around a closed circuit in a reactor, but to transport the solid material into an air stream which, in turn, then carries the material into the reactor. The specification does not disclose how the actual reactor is constructed or how the reaction shall take place in the reactor, but merely states that the reactor shall include a fluidized bed.

At present, there is not known to the art a combustion reactor in which reactants and reaction products are conducted round in a system in the manner taught by the present invention. If this were to be attempted in present-day reactor constructions, it would be first necessary to purify the gases and then pass the gases through another compressor. When practicing the present invention, the gases and therewith also solid material are driven around the circuit by means of an ejector effect, while at the same time supplying fresh oxygen-containing gas for combustion and preferably also fresh fuel for gasification.

The present invention enables a desired degree of fluidization to be maintained in the reactor, and it is also possible to set the reactor to a desired reactant residence time, or stay time, in the gasification reaction. This is particularly favourable from an energy aspect, since all of the energy supplied will increase the energy content of the reactor and therewith also the energy content of the gases that are discharged from the reactor to a downstream gas turbine or steam boiler.

With regard to the gasification reactions, the reactor residence time can be made longer than is possible in present-day reactor constructions. This enables a higher degree of conversion to be attained and therewith the production of less tar products and carbon than with known types of gasification reactors.

The inventive method and the inventive reactor can be applied and used with all types of fuel in solid or liquid form. The method and apparatus can be used to particular advantage for gasifying biofuels, such as waste products from the wood and pulp industries, wood powder and wood chips, and domestic waste, and can also be used to gasify spent liquors that derive from the pulp industry, such as black liquor or sulphite liquor that has been vapourized to a greater or lesser extent, and also mineral coal and charcoal. Preferably, it will be possible to finely-divide the starting material and also to be able to transport the starting material in a stream of gas.

The oxygen-containing gas supplied for partial combustion of the fuel will preferably be air, which may be enriched with oxygen. The use of pure oxygen gas is also conceivable in special cases.

According to one particularly preferred embodiment of the invention, the gasification reaction is effected with the aid of a fluidized bed contained in the reactor. This bed may contain the fuel and optionally also such auxiliary substances as catalysts and carrier material. The bed is fluidized by means of the gas stream that is driven around the circuit by the ejector effect generated.

BRIEF DESCRIPTION OF THE DRAWINGS

In the accompanying drawing.

Further to FIG. 1.

DESCRIPTION OF THE PREFERRED EMBODIMENTS

Figure 1:
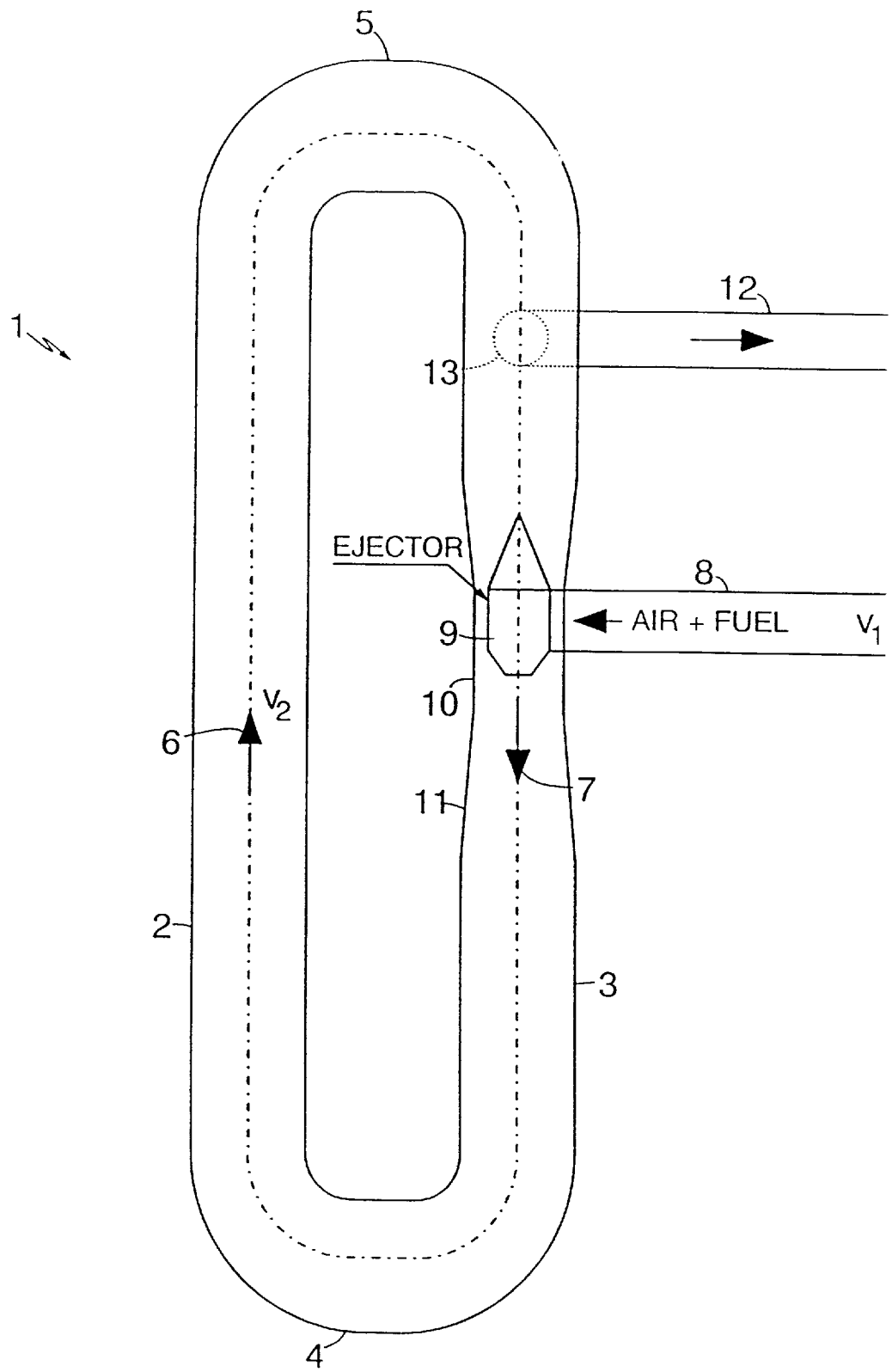
FIG. 1 illustrates schematically a reactor constructed in accordance with the invention.

The reactor illustrated in FIG. 1 includes a reactor chamber, generally referenced 1, which is configured as a closed circuit. As shown in FIG. 1, the reactor chamber may include two essentially straight parts 2 and 3 which are joined mutually by shorter cross-connections 4 and 5, although other configurations are possible, for instance a more circular configuration. The essential feature of the inventive reactor chamber is that it will enable reactants and reaction products to circulate in a closed path, as illustrated by the arrows 6 and 7.

The reactor chamber 1 includes an inlet line 8 through which oxygen-containing gas, primarily air, and in the illustrated case also fuel are delivered to the reaction chamber.

The inlet or delivery line 8 discharges into an ejector 9 in the reactor chamber 1. The flow path along which reactants and reaction products travel is constricted by a constriction 10 at the location of the ejector, whereafter the flow path diverges at 11 such as to generate an effective ejector effect. The principle design and function of an ejector is well known to the person skilled in this art and need not be described in detail here.

The fuel may also be delivered to the reactor separately from the oxygen-containing gas, through a separate delivery line (not shown), and mixed with the gas at some location in the reactor chamber other in the ejector. When gasifying black liquor and when burning domestic waste, it is preferred to introduce the fuel into the reactor- at a point slightly downstream of the ejector. In all cases, however, it is essential that the mixture of reactants and reaction products are driven effectively round the circuit by the gas stream in the ejector.

The reactor chamber 1 also includes an outlet line 12 for reaction products. These products are comprised mainly of combustible gas and secondary products, such as tar, carbon and ash. In the case of the preferred embodiment, the outlet line is connected to the reactor chamber 1 at a location 13 which, when seen in the direction of flow, is slightly upstream of the delivery line 8 and the ejector. This location is preferred in order not to disturb the gas stream passing through the reactor.

The inventive reactor works in the following way:

A mixture of oxygen-containing gas and fuel is delivered to the reactor chamber 1 through the delivery line 8 at a volume flow of $v_1$. Due to the effect generated by the ejector 9 and due to the configuration of the flow path in the reactor, a lower pressure will be generated downstream of the location at which the delivery line 8 discharges into the reactor chamber 1. This results in a gas flow that travels in the directions of the arrows 6 and 7 and the reactor chamber is dimensioned to generate a volume flow $v_2$ which is greater than the volume flow $v_1$ in the inlet. This will ensure that a sufficient residence time is obtained in the reactor. The volume flow $v_2$ will also be sufficient for driving the mixture of reactants and reaction products around the closed circuit in the reactor.

Gaseous products and other reaction products are discharged from the reactor through the outlet line 12 for further processing, as described in more detail below A suitable reactor residence time with regard to reactants and reaction products can be obtained by controlling the flow in the outlet line 12, and therewith also a desired conversion level. This is an essential advantage afforded by the invention.

The reactor chamber 1 may be positioned horizontally, vertically or may be inclined at any desired angle. In one suitable embodiment, the reactor chamber includes a fluidized bed of reactants and optionally also other material, such as catalysts and/or inert bed material. This bed may be arranged stationarily in a vertical part of the reactor chamber. However, the solid materials may also be fluidized by transportation with the gas stream in the reactor circuit, therewith ensuring highly effective reaction contact between solid material and gas phase. After being discharged from the reactor through the outlet line 12, solid material can be extracted and returned to the reactor, if so desired.

Figure 2:
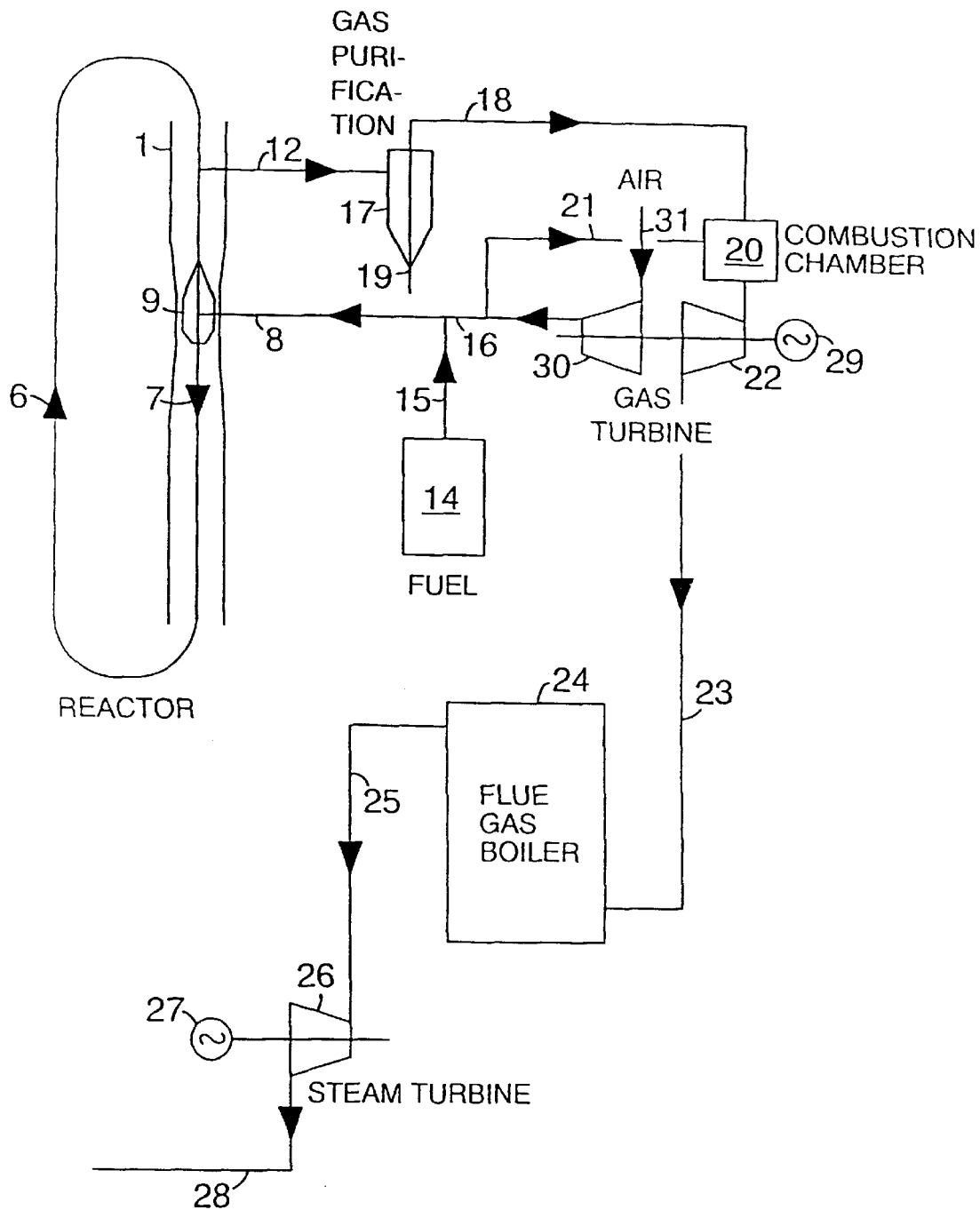
FIG. 2 is a flow sheet which illustrates the inventive reactor included in an energy recovery plant.

FIG. 2 illustrates an inventive reactor included in an energy generating system. Reactants and reaction products are kept circulating in the reactor, illustrated schematically at 1, in the directions of the arrows 6 and 7, by means of an ejector effect generated by the ejector 9. Fuel is taken from a fuel source 14, which may include means for finely-dividing the fuel and treating the fuel in other ways, such as drying, and is passed through the line 15 and mixed with oxygen-containing gas, particularly air, from the line 16 and is then delivered to the reactor through the delivery line 8. The mixture of oxygen-containing gas and fuel flows through the ejector 9 and is thereby driven around the closed circuit while reacting in the aforedescribed manner.

In some applications, for instance when gasifying concentrated black liquor and combusting waste, the delivery line 15 passing from the fuel source 14 will preferably not be connected to the line 16 for delivering the oxygen-containing gas, but instead will pass directly to the reactor 1. In this case, the fuel inlet is preferably located at a point slightly downstream of the ejector 9.

Reaction products are taken out through the discharge line 12 and are passed first to a gas purifying apparatus, for instance a cyclone. Purified gas is taken from the cyclone through the line 18, whereas solid and liquid secondary products, such as tar, carbon and ash, are taken out through a bottom outlet 19. Part of these secondary products may be returned to the reactor for further conversion or transformation.

The purified gas is passed through the line 18 to a combustion chamber 20, in which the gas is mixed with oxygen-containing gas taken from the line 21 and combusted, whereafter the gases of combustion are passed to a gas turbine 22, in which they carry out useful work, and from there through a line 23 to a flue gas boiler 24, where the remaining thermal energy content of the gases is used to generate steam. This steam is passed through the line 25 to a steam turbine 26 which drives an electric generator 27. Steam is passed from the steam turbine 26 through the line 28 to a condenser and a supply water tank (not shown) for the flue gas boiler 24. After having delivered their combustion energy, the gases are taken out from the boiler 24 through the outlet 29 and may optionally be further cleansed prior to releasing the gases to atmosphere.

The gas turbine 22 drives an electric generator 29 and a compressor 30, to which oxygen-containing gas, particularly air, is delivered through the delivery line 31. The air compressed and heated in the compressor is then passed partly through the line 21 to the gas-turbine combustion chamber 20, and partly through the line 16 for mixture with the fuel taken from the fuel source 14 and is delivered to the reactor 1 through the inlet or delivery line 8.

Figure 3:
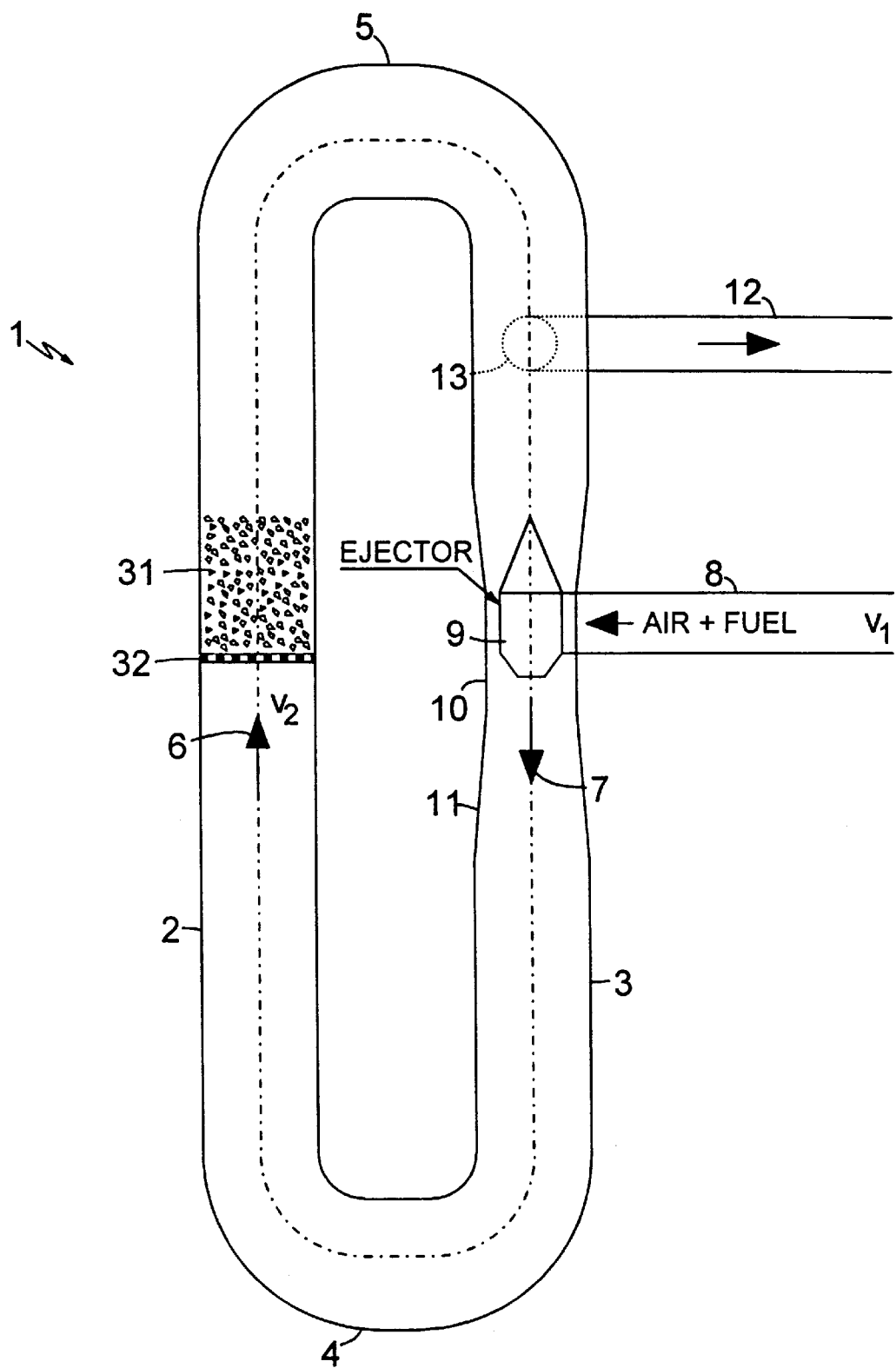
FIG. 3 illustrates a supported fluidized bed in a preferred embodiment of the invention.

In addition to the features shown in FIG. 1, FIG. 3 shows a fluidized bed 31 on a permeable or porous support 32 in the straight part 2 of the reactor 1.

It will be understood that the illustrated energy recovery system merely constitutes an example and that the inventive reactor may be included in many other types of system. For instance, the reactor can be used to produce synthetic gas which can then be converted to different products.

The technical design of the inventive reactor is determined by the specific gasification reaction which is to be effected and by such reaction parameters as reaction temperature and reaction pressure, residence time and the quantity of reactants to be charged to the system per unit of time. With knowledge of these reaction parameters and other conditions, it lies within the competence of one skilled in this art to work out the reactor construction in detail, when having a good understanding of the invention. The choice of construction material and the choice of necessary auxiliary devices, such as pipe lines, valves, measuring apparatus, pumps and heating devices, etc., also lie within the competence of the skilled person.

Although the present invention has been described and illustrated with reference to a particular exemplifying embodiment thereof, it will be understood that this embodiment merely constitutes an example and that several modifications and variants are possible within the scope of the following claims.

I claim:

1. A method for recovering energy and/or combustible gas from fuel by thermal gasification of the fuel by a partial combustion thereof in a gasification reactor, comprising the steps of:

providing a gasification reactor defining a closed flow path for the reactants and reactant products;

introducing a fuel into the closed flow path as a first reactant;

introducing oxygen-containing gas into the closed flow path as a second reactant;

thermally gasifying the fuel by the partial combustion thereof in the closed flow path at a pressure within the range of about 2–40 bar above atmospheric pressure, thereby forming reaction products;

causing, during the partial combustion, the reactants and reaction products to circulate within the closed flow path by introducing at least the oxygen-containing gas into the flow path through an ejector located within the flow path so as to drive the reactants and reaction products around the flow path; and discharging reaction products from the reactor.

2. A method according to claim 1, wherein the oxygen-containing gas and the fuel are introduced into the closed flow path of the reactor together through the ejector.

3. A method according to claim 1, wherein the fuel-introducing step comprises introducing the fuel into the closed flow path of the reactor separately from the gas and at a location downstream of the ejector.

4. A method according to claim 1 wherein the discharging step comprises discharging the reaction products from the reactor at a location upstream from the ejector.

5. A method according to claim 1 wherein the oxygen-containing gas is air or oxygen-enriched air.

6. A method according to claim 1 wherein the fuel is biofuel, spent liquor from the pulp industry and/or coal.

7. A method according to claim 1 further comprising the step of effecting the gasification reaction with the aid of a fluidized bed in the reactor.

8. A reactor for recovering energy and/or combustible gas from fuel by thermally gasifying the fuel during partial combustion, the reactor comprising:

a reactor chamber defining a closed flow path for the reactants and reactant products;

an inlet for the fuel;

an inlet for oxygen-containing gas; and an outlet for reaction products, the reactor chamber being arranged, at the oxygen-containing gas inlet, to form an ejector located in the closed flow path such that the oxygen-containing gas introduced into the reactor will function to drive the reactants and the reaction products around the flow path.

9. A reactor according to claim 8, wherein the fuel inlet and the oxygen-containing gas inlet are the same.

10. A reactor according to claim 8, wherein the fuel inlet is located downstream of the ejector.

11. A reactor according to claim 8 wherein the outlet for reaction products is located upstream of the oxygen-containing gas inlet.

12. A reactor according to claim 8 wherein the reactor chamber includes a fluidized bed.

* * * * *